United States Patent [19]

Kunugihara et al.

[11] Patent Number: 4,969,974
[45] Date of Patent: Nov. 13, 1990

[54] METHOD FOR MAKING ELECTRODE FOIL FOR AN ELECTROLYTE CAPACITOR

[75] Inventors: Hiromu Kunugihara, Kyoto; Kazuo Okamura; Fumio Kudo, both of Joyo; Ryoichi Shimatani, Kyoto; Nobuyoshi Kanzaki, Joyo, all of Japan

[73] Assignee: Matsushita Electric Industrial Co., Ltd., Kadoma, Japan

[21] Appl. No.: 388,377

[22] Filed: Aug. 2, 1989

[30] Foreign Application Priority Data

Aug. 8, 1988 [JP] Japan ................. 63-197429

[51] Int. Cl.$^5$ .................... C23F 1/00; B44C 1/22; C03C 15/00; C03C 25/06
[52] U.S. Cl. .................. 156/665; 148/6.15 R; 204/33; 204/35.1; 204/38.3
[58] Field of Search ............ 156/664, 665, 651, 654; 252/79.2, 79.5, 142, 156; 134/41; 148/6.15 R; 204/33, 35.1, 38.3

[56] References Cited

U.S. PATENT DOCUMENTS

| 2,166,990 | 7/1939 | Gray | 156/665 X |
| 4,419,259 | 12/1983 | Riley et al. | 252/79.4 X |
| 4,437,946 | 3/1984 | Bernard | 204/35 N |

FOREIGN PATENT DOCUMENTS 62-134920 6/1987 Japan .

Primary Examiner—William A. Powell
Attorney, Agent, or Firm—Cushman, Darby & Cushman

[57] ABSTRACT

In the method for making electrode foil for an aluminum electrolyte capacitor, in order to obtain a formation layer of aluminum foil having superior waterproof nature and good stability, surface-roughened aluminum foil has hydration treatment, first formation treatment, dipping in aqueous solution of ammonium dihydrogen phosphate and second formation.

9 Claims, 3 Drawing Sheets

Concentration of borax in aqueous solution in the hot water boiling treatment

*Temperature of aqueous solution of borax

Concentration of borax in aqueous solution in the hot water boiling treatment

*Temperature of aqueous solution of borax

Temperature of the heat treatment

Temperature of aqueous solution of ammonium di-hydrogen phosphate

*Concentration of aqueous solution of ammonium di-hydrogen phosphate

METHOD FOR MAKING ELECTRODE FOIL FOR AN ELECTROLYTE CAPACITOR

FIELD OF THE INVENTION

The present invention relates to a method for making electrode foil for an aluminum electrolyte capacitor.

DESCRIPTION OF THE RELATED ART

In a conventional aluminum electrolytic capacitor, electrode foil is electrolytically etched in order to enlarge effective surface area. On the enlarged surface of the electrode foil, an anodic oxide film as a dielectric film is formed by formation treatment, and a capacitor element is formed by winding two electrode foils with separators impregnated with electrolyte therebetween.

A formation process wherein the oxidized layer is formed on the surface of the aluminum foil has the following process and treatment.

The etched aluminum foil which comes to have a surface-roughened surface by an etching process is boiled in pure water to form boehmite layer (AlOOH); the step is called a hydration treatment. And the foil is formated in an aqueous solution state of boracic acid, phosphoric acid, citric acid, adipic acid or salt thereof usually, as a first formation.

After the first formation, the formation layer is in an unstable condition due to voids existing in the layer. After the formation, a stabilizing treatment which is called depolarization treatment is carried out and the formation is made again. These treatments remove the voids and result in being able obtain a stable layer. These formation and depolarization steps are usually repeated two or three times.

For depolarization, the most usual treatment is a heat treatment or hot water boiling. However, another method of boiling in aqueous solution of boracic acid for exposure of voids has been proposed in U.S. application Ser. No. 528,183 now U.S. Pat. No. 4,437,946. A method utilizing combination of a hot water boiling treatment and a heat treatment with aqueous solution of phosphoric acid ($H_3PO_4$) is proposed in Japanese unexamined published patent application No. (Sho 62-134920).

Recently, the demand for high reliability of aluminum electrolyte capacitors is increasing year by year, and the demand for high stability of the formation layer of an electrode foil is increasing. But the above-mentioned conventional methods cannot provide sufficient stability of the formation layer.

The reason for insufficient stability is elucidated hereafter. An electrolyte liquid for driving an aluminum electrolyte capacitor contains organic solvent as its main content such as ethylene glycol and contains 2% water usually. When an electrolytic capacitor is used for a long time at high temperature, the water in the electrolyte liquid has a reaction with the formation layer, which leads to produce hydrate having a low withstand voltage and this hydrate worsens the insulation of the layer. Therefore, in order to prevent the layer from this hydration reaction a, strong waterproof layer is required. A heat treatment or method of boiling in pure water or aqueous solution of boracic acid in the middle of the formation treatment taught in the above-mentioned U.S. application Ser. No. 528,183 has only a little waterproof effect.

The method taught in Japanese unexamined published patent application No. (Sho 62-134920) makes some improvement upon this waterproof problem. In the method of No. Sho 62-134920, an ion of phosphoric acid is absorbed into the formation layer, since the layer is infiltrated with aqueous phospholic acid in its voids made by pure water boiling or heat treatment. This oxidized layer including an ion of phospholic acid has a strong waterproof nature.

But the method of No. Sho 62-134920 has the below-mentioned problem. Aqueous orthophosphoric acid has a strong acidity showing the pH values of 1-2, which melts part of the formation layer. Namely, though this method can improve the waterproof nature of the layer by absorption of an ion of phosphoric acid, it results in a decrease (deterioration) of the withstand voltage on account of melting of the layer itself, which is a serious problem of this method.

OBJECT AND SUMMARY OF THE INVENTION

The object of the present invention is to solve the above-mentioned problem and obtain a formation foil having high stability and a strong waterproof nature.

These objects are accomplished by a method for making electrode foil for an aluminum electrolyte capacitor comprising the steps of:

carrying out a hydration treatment of surface-surface-roughened aluminum foil, carrying out a formation treatment utilizing aqueous boracic acid, phosphoric acid, adipic acid or citric acid, carrying out a hot water boiling treatment, carrying out a heat treatment, carrying out a dipping in aqueous solution of ammonium di-hydrogen phosphate, and a second formation treatment.

In the method for making electrode foil for an aluminum electrolyte capacitor of the present invention, instead of aqueous phosphoric acid which causes undesirable solution of the formation layer leading to a decrease of the withstand voltage of the layer, aqueous ammonium di-hydrogen phosphate, which is a salt of phosphoric acid, is used. Aqueous ammonium di-hydrogen phosphate having a pH value of 4-5 indicating a weak acid never causes an undesirable solution of oxidized aluminum layer. Thus the utilizing of aqueous ammonium di-hydrogen phosphate instead of the aqueous phosphoric acid results in no decrease of the withstand voltage and results in adsorption of an ion of phosphoric acid on the surface of the layer leading to an increase of waterproof thereof.

While the novel features of the invention are set forth particularly in the appended claims, the invention, both as to organization and content, will be better understood and appreciated, along with other objects and features thereof, from the following detailed description taken in conjunction with the drawings.

DESCRIPTION OF THE PREFERRED EMBODIMENTS

Figure 1:
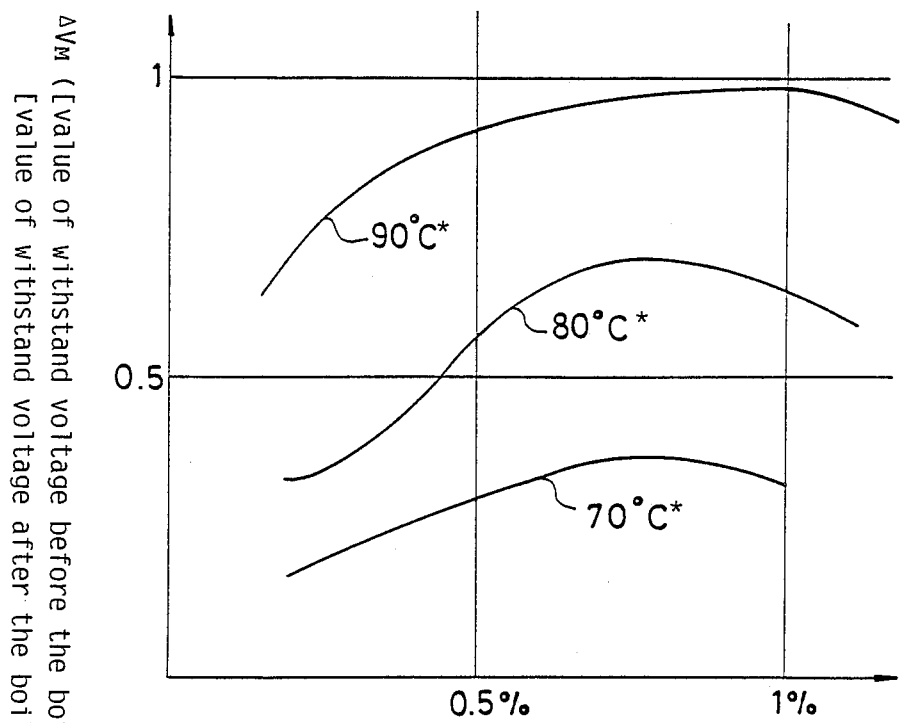
FIG. 1 is a diagram showing the relation of $\Delta V_M$ with concentration of borax in an aqueous solution in the hot water boiling treatment.

Hereafter, preferred embodiments of the present invention are explained with reference to the accompanying drawings.

[First Experiment]

In the first experiment, examples 1 to 7 are obtained through the same hydration treatments and formation treatments, followed by one of the below-mentioned seven different depolarization treatments and followed by the same second formation treatment. The following are the hydration treatment and formation treatment. Rough etched (aluminum) foil is subjected to a hydration treatment for five minutes. And the formation treatment in aqueous boracic acid (concentration: 80 g/l) under a constant voltage of 375 V at a temperature of 90° C. for 10 minutes is made. And after the above-mentioned depolarization treatment, the same second formation treatment is made similarly.

It is difficult to estimate changing as time lapse for each sample as a capacitor when it is used in an electrolyte liquid including water under high temperature for a long time. Thus, instead of long use as a capacitor for estimating actual change, the samples are boiled in deionized water at 100° C. for 2 hours as a life test with a shortened period. Before and after the boiling in the life test, values of the capacitance and of the withstand voltage of the samples, which are the most important characteristics of a capacitor, are measured. The obtained change rate of these values, such as $\Delta$Cap [value of capacitance before the boiling]/[value of capacitance after the boiling] and $\Delta V_M$ [value of the withstand voltage before the boiling]/[value of withstand voltage after the boiling] are shown in Table 1.

The depolarization treatments for examples 1 to 7 are elucidated hereafter.

(Example 1)

This depolarization treatment is taught in U.S. application Ser. No. 528,183. Hot water boiling treatment of dipping the object in aqueous solution of 0.1% borax at 90° C. for 5 minutes is a depolarization treatment in this example 1.

(Example 2)

This depolarization treatment is taught in the Japanese unexamined published application No. Sho 62-134920. A chain of hot water boiling in pure water for 5 minutes, heat treatment at 400° C. for 5 minutes and dipping in 1% aqueous phosphoric acid at 50° C. for 5 minutes is a depolarization treatment in this example.

(Example 3)

In this example 3, heat treatment at 400° C. for 5 minutes is made as a depolarization treatment.

(Example 4)

In this example 4, a chain of hot water boiling treatment of dipping in an aqueous solution of 0.1% borax at 90° C. for 5 minutes and heat treatment at 400° C. for 5 minutes is made as a depolarization treatment. In the reverse order of the above-mentioned hot water boiling treatment and heat treatment, the same data as shown in Table 1 is obtained.

(Example 5)

A depolarization treatment of the present invention is shown in this example 5. A chain of hot water boiling treatment of dipping in aqueous solution of 0.1% borax at 90° C. for 5 minutes, heat treatment at 400° C. for 5 minutes and dipping in aqueous 1% ammonium di-hydrogen phosphate at 80° C. for 5 minutes is carried out as the depolarization treatment.

(Example 6)

In this example 6, a chain of hot water boiling treatment in an aqueous solution of 0.1% borax at 90° C. for 5 minutes and dipping in an aqueous solution of 1% ammonium di-hydrogen phosphate at 80° C. for 5 minutes is carried out as a depolarization process.

(Example 7)

In this example 7, a chain of heat treatment at 400° C. for 5 minutes and dipping in aqueous solution of 1% ammonium di-hydrogen phosphate at 80° C. for 5 minutes is carried out as a depolarization process.

TABLE 1

| Number | Name | $\Delta$Cap | $\Delta$Vm |
|---|---|---|---|
| 1 | Example 1 | 0.43 | 0.55 |
| 2 | Example 2 | 0.82 | 0.73 |
| 3 | Example 3 | 0.40 | 0.55 |
| 4 | Example 4 | 0.42 | 0.43 |
| 5 | Example 5 | 1.00 | 0.98 |
| 6 | Example 6 | 0.95 | 0.95 |
| 7 | Example 7 | 0.95 | 0.95 |

In Table 1, examples 5, 6 and 7 show much improvement of the waterproof nature of the formation layer and a stable formation layer is obtained.

From the result of these examples 6 and 7, in a depolarization process, when at least only one of the hot water boiling treatment or the heat treatment and dipping in aqueous solution of 1% ammonium di-hydrogen phosphate are made, the formation layer which is stable almost the same as the example 5 can be obtained.

[Second Experiment]

In the same condition as the above-mentioned example 5, some conditions are changed such as the temperature and the concentration of borax of the hot water boiling treatment of dipping in aqueous solution of borax. And other conditions, such as heat treatment at 400° C. and dipping in aqueous solution of 1% ammonium di-hydrogen phosphate at 85° C., are almost as same as in the example 5. Obtained data as to $\Delta V_M$ are shown in FIG. 1. As is observed in FIG. 1, as the temperature of hot water boiling treatment is higher, the value of $\Delta V_M$ shows the more preferable good stability. And when the concentration of borax in aqueous solution is between 0.5% and 1%, the value of $\Delta V_M$ shows the preferable good stability. In all of these experiments, the period of hot water boiling treatment is 5 minutes. If the period is below 2 minutes, the reaction is insufficient. If the period is over 10 minutes, the effect of the reaction is saturated. The period between 2 minutes and 10 minutes shows almost the same result. In all of the below-mentioned experiments, the period of the hot water boiling treatment is always kept constant at 5 minutes.

[Third Experiment]

It is examined whether there is any difference as to changes as time lapses for two samples from two ways of supplying voltage such as supplying voltage to aluminum foil directly or supplying voltage to one indirectly (through some material) in the formation treatment.

In example 8, voltage is supplied from an electric supplying roller made of metal directly to the aluminum foil. Surface-roughened etched foil has a hydration treatment in hot pure water at over 95° C. for five minutes in both examples 8 and 9. And the first formation treatment in aqueous solution of boracic acid (concentration: 80 g/l) under constant voltage of 375 V is supplied through the roller, at a temperature of 90° C. for 10 minutes is made, in the example 8. After the above-mentioned depolarization treatment wherein a chain of hot water boiling treatment of dipping in aqueous solution of 0.1% sodium carbonate at 90° C. for five minutes, a heat treatment at 400° C. for five minutes and dipping in aqueous solution of 1% ammonium di-hydrogen phosphate at 80° C. for 5 minutes is carried out, a second formation treatment the same as the first one is made again.

In example 9, voltage is supplied through an electric supplying liquid (in this case aqueous solution of ammonium adipate is used) and an anode electrode for power source set in an electric supplying case. Namely formation treatment in this example is made by supplying voltage indirectly through liquid. The other conditions are the same as in example 8. Obtained data as to $\Delta$Cap and $\Delta V_M$ of examples 8 and 9 are shown in Table 2.

TABLE 2

|  | $\Delta$Cap | $\Delta$Vm |
|---|---|---|
| Example 8 | 0.83 | 0.81 |
| Example 9 | 0.82 | 0.80 |

Table 2 shows that there is no difference as to the effects between the supplying of voltage directly or indirectly in the formation treatment.

In this experiment, sodium carbonate is used in place of borax, and as shown in Table 2, these data as to $\Delta$Cap and $\Delta V_M$ are superior than the ones of other examples No. 1, 2 or 3. Thus, it is recognized that sodium carbonate is usable in place of borax.

A further consideration about data of these borax and sodium carbonate shows that an aqueous solution of borax-or sodium-carbonate has pH values of 8–10 indicating alkalescent. Aluminum has a feature that it is easy to react in alkalescent aqueous solution and it is hard to react in an aqueous solution of weak acid. Since the pH values of these aqueous solutions show those of alkalescent, addition of borax or sodium carbonate results in a stable ability of the layer.

[Fourth Experiment]

Figure 2:
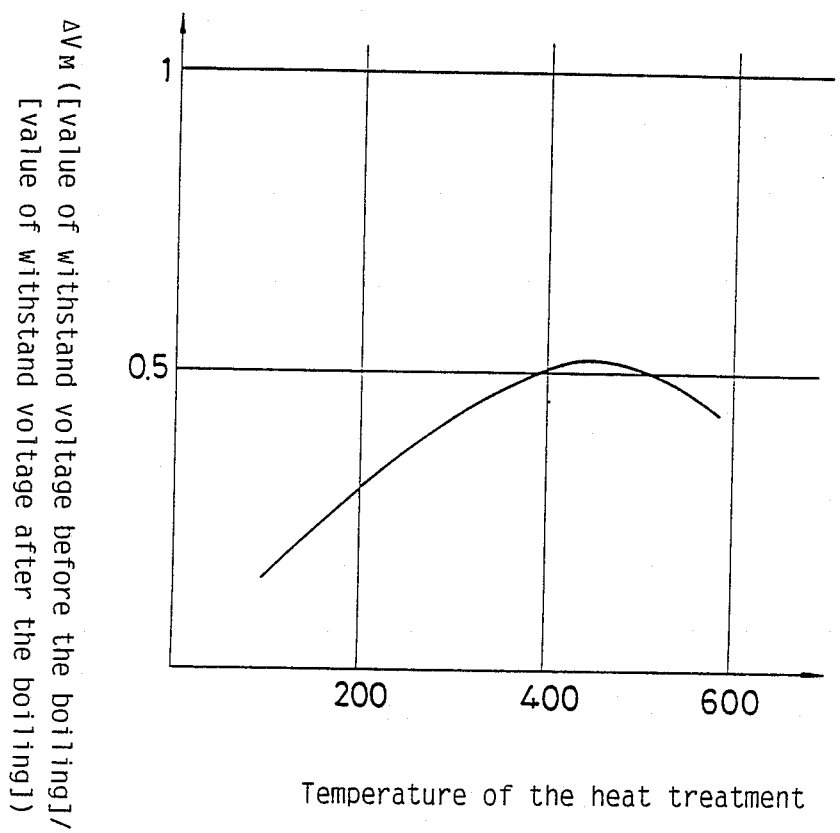
FIG. 2 is a diagram showing the relation of $\Delta V_M$ with the temperature of the hot treatment in the depolarization treatment.

It is examined what the preferable range of temperature for the heat treatment is. In this fourth experiment, etched foil is boiled in pure water at 90° C. for five minutes in place a water boiling treatment, the heat treatments are made at several points of temperature chosen between 200° C. and 600° C., and dipping in an aqueous solution of 1% ammonium di-hydrogen phosphate at 80° C. is made. A chain of these treatment is carried out as a depolarization process. Obtained data as to $\Delta V_M$ (which is defined in the first embodiment) is shown in FIG. 2. From FIG. 2, when the temperature of the heat treatment is in the range of between 350° C. and 500° C. the change of $\Delta V_M$ is controlled small, which is the preferable result.

[Fifth Experiment]

Figure 3:
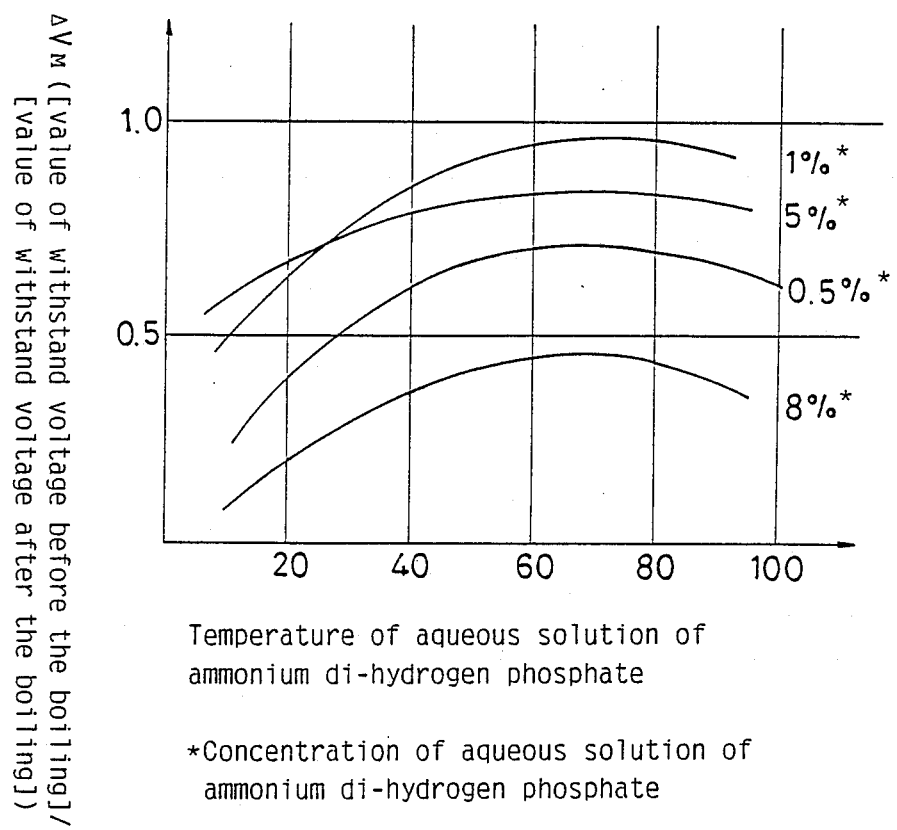
FIG. 3 is a diagram showing the relation of $\Delta V_M$ with the concentration of an aqueous solution of ammonium di-hydrogen phosphate and the temperature thereof in the depolarization treatment.

The concentration and temperature in dipping in an aqueous solution of ammonium di-hydrogen phosphate in the depolarization treatment is examined. In this fifth experiment, etched foil is boiled in an aqueous solution of 0.1% borax at 90° C. for 5 minutes, as a hot water boiling treatment, the heat treatment at 400° C. is made, and with several concentrations of an aqueous solution of ammonium di-hydrogen phosphate between 1% and 5%, and at several temperatures thereof between 20° C. and 90° C., dipping therein is made under each changed concentration and temperature. Obtained data as to value of $\Delta V_M$ (which is defined in the first embodiment) is shown in FIG. 3. From FIG. 3, when the concentration of aqueous solution of ammonium di-hydrogen phosphate is between 1% and 5% and the temperature thereof is in the range of between 40° C. and 80° C., preferable $\Delta V_M$ is obtained.

Although the invention has been described in its preferred form with a certain degree of particularity, it is understood that the present disclosure of the preferred form has been changed in the details of construction and the combination and arrangement of parts may be resorted to without departing from the spirit and the scope of the invention as hereinafter claimed.

What is claimed is:

1. A method for making electrode foil for an aluminum electrolyte capacitor comprising the steps of;
   carrying out a hydration treatment by boiling surface-roughened aluminum foil in pure water,
   carrying out a first formation treatment of said surface-roughened aluminum foil after said hydration treatment in at least one aqueous solution selected from the group consisting of boracic acid, phosphoric acid, adipic acid, citric acid and mixtures thereof,
   carrying out a hot water treatment by dipping said surface-roughened aluminum foil in hot water after said first formation treatment,
   carrying out a heat treatment of said surface roughened aluminum foil after said hot water treatment,
   carrying out dipping of said surface-roughened aluminum foil in aqueous solution of ammonium di-hydrogen phosphate after said heat treatment, and
   carrying out a second formation treatment which is same as said first formation treatment of said surface-roughened aluminum foil after said dipping.

2. A method for making electrode foil for an aluminum electrolyte capacitor in accordance with claim 1 wherein;
   in said hot water treatment, said dipping is made in alkalescent aqueous solution including borax, sodium carbonate or equivalent thereof in the range of between 0.01% and 0.5% at the temperature in the range of between 80° C. and 95° C.

3. A method for making electrode foil for an aluminum electrolye capacitor in accordance with claim 1 wherein;
   in said heat treatment, the temperature is in the range of between 350° C. and 500° C.

4. A method for making electrode foil for an aluminum electrolye capacitor in accordance with claim 1 wherein;

in said dipping in aqueous solution of ammonium di-hydrogen phosphate, the concentration of said aqueous solution of ammonium di-hydrogen phosphate is between 1% and 5%, and the temperature thereof is in the rage of between 40° C. and 80° C.

5. A method for making electrode foil for an aluminum electrolyte capacitor in accordance with claim 1 wherein;
in at least one of said first and second formation treatment, a supplying voltage is supplied to said aluminum foil through an electric supplying liquid.

6. A method for making electrode foil for an aluminum electrolyte capacitor comprising the steps of;
carrying out a hydration treatment by boiling surface-roughened aluminum foil in pure water,
carrying out a first formation treatment of said surface-roughened aluminum foil after said hydration treatment in at least one aqueous solution selected from the group consisting of boracic acid, phosphoric acid, adipic acid, citric acid and mixtures thereof,
carrying out a hot water treatment by dipping said surface-roughened aluminum foil in hot water after said first formation treatment,
carrying out a dipping of said surface-roughened aluminum foil in aqueous solution of ammonium di-hydrogen phosphate after said heat treatment, and
carrying out a second formation treatment which is the same as said first formation treatment of said surface-roughened aluminum foil after said dipping.

7. A method for making electrode foil for an aluminum electrolyte capacitor in accordance with claim 6 wherein;
in said hot water treatment, said dipping is made in pure water or alkalescent aqueous solution including borax, sodium carbonate or equivalent thereof in the range of between 0.01% and 0.5% at the temperature in the range of between 80° C. and 95° C.

8. A method for making electrode foil for an aluminum electrolye capacitor in accordance with claim 6 wherein;
in said dipping in aqueous solution of ammonium di-hydrogen phosphate, the concentration of said aqueous solution of ammonium di-hydrogen phosphate is between 1% and 5%, and the temperature thereof is in the rage of between 40° C. and 80° C.

9. A method for making electrode foil for an aluminum electrolyte capacitor in accordance with claim 6 wherein;
in at least one of said first and second formation treatment, a supplying voltage is supplied to said aluminum foil through an electric supplying liquid.

* * * * *